(12) United States Patent
Onda

(10) Patent No.: US 6,305,641 B1
(45) Date of Patent: Oct. 23, 2001

(54) SUPER-PRESSURED HIGH-ALTITUDE AIRSHIP

(75) Inventor: Masahiko Onda, Tsukub (JP)

(73) Assignee: Agency of Industrial Science and Technology, Tokyo (JP)

( * ) Notice: Subject to any disclaimer, the term of this patent is extended or adjusted under 35 U.S.C. 154(b) by 0 days.

(21) Appl. No.: 09/536,683

(22) Filed: Mar. 28, 2000

(30) Foreign Application Priority Data

Mar. 29, 1999 (JP) .................................................. 11-087207

(51) Int. Cl.[7] .......................................................... B64B 1/62
(52) U.S. Cl. ................................................. 244/30; 244/97
(58) Field of Search ................... 244/30, 29, 96, 244/97, 93

(56) References Cited

U.S. PATENT DOCUMENTS

| | | | |
|---|---|---|---|
| 847,965 | * | 3/1907 | Miller . |
| 1,457,024 | * | 5/1923 | Franzen . |
| 1,608,461 | * | 11/1926 | Cogswell . |
| 1,835,260 | * | 12/1931 | Barrera . |
| 2,475,786 | * | 7/1949 | Jordan . |
| 2,478,792 | * | 8/1949 | Trey . |
| 3,971,533 | * | 7/1976 | Slater . |
| 4,967,983 | * | 11/1990 | Motts . |
| 5,071,090 | * | 12/1991 | Takahashi et al. . |
| 5,348,254 | * | 9/1994 | Nakada . |

FOREIGN PATENT DOCUMENTS

| | | | | |
|---|---|---|---|---|
| 1159034 | * | 12/1983 | (CA) . | |
| 1531350 | * | 2/1970 | (DE) | ......................................... 244/30 |
| 2043950 | * | 3/1972 | (DE) | ......................................... 244/29 |
| 1191321 | * | 5/1970 | (GB) | ......................................... 244/29 |

* cited by examiner

Primary Examiner—Charles T. Jordan
Assistant Examiner—Tian Dinh
(74) Attorney, Agent, or Firm—Oblon, Spivak, McClelland, Maier & Neustadt, P.C.

(57) ABSTRACT

A super-pressured high-altitude airship flies in the stratosphere, is propelled against the wind by the power obtained through the photovoltaic conversion of the sunlight, and is used for a large-scale LTA (light-than-air) platform for environmental observation, telecommunication relay, etc. This airship has a super-pressure structure which has a pressure-resistant gas bag in an envelope capable of enduring the rise of internal pressure by allowing no in-flow or out-flow of gas from or to, respectively, the outside atmosphere at the mission altitude. A solar cell is installed on an upper external surface of the envelope. A ventilation space is provided between an installation surface of the solar cell and the gas bag to block the heat transfer from the solar cell to the buoyant gas in the envelope. A fan is provided to forcibly circulate the outside atmospheric air in this ventilation space. The envelope trims the static balance of the airship pitch angle by shifting an on-board weight in the longitudinal direction.

10 Claims, 1 Drawing Sheet

SUPER-PRESSURED HIGH-ALTITUDE AIRSHIP

CROSS-REFERENCE TO RELATED APPLICATIONS

This application is related and claims priority, under 35 U.S.C. §119, Japanese Patent Application No. 11-087207, filed on Mar. 29, 1999, the entire contents of which is hereby incorporated by reference herein.

BACKGROUND OF THE INVENTION

1. Field of the Invention

The present invention generally relates to a super-pressured high-altitude airship and more specifically, to a high-altitude airship of super-pressure structure which flies in the stratosphere, is propelled against the wind with the power obtained through the photovoltaic conversion of the sunlight, generally allows no in-flow or out-flow of the gas in an airship hull (a gas bag) from or to, respectively, the atmosphere in the stratosphere, is a large-scale LTA (Lighter-Than-Air) platform for observation for the global environmental protections and for telecommunication relay, copes with the temperature fluctuations of the buoyant gas with the pressure resistance, and keeps constant full volume even when the pressure of the buoyant gas if fluctuated.

2. Discussion of Background

Conventional scientific balloons allow expansion of internal helium gas since the balloons do not have air for venting when ascending, and the ascension occurs with an usable buoyancy by preventing a rise in internal pressure rise as compared with the atmospheric air outside of the balloons. In horizontal flight, the balloons are flown by the wind by dropping ballast to cope with the loss of buoyancy. When the balloons have to descend, the balloon skin is ripped in order to vent the buoyant gas, and the payloads descend by parachutes.

On the other hand, in the low stratosphere, namely at an altitude of about 20 km above ground level, the weather is fine throughout the year and the wind is relatively weak, so that it is effective to make a large-scale LTA platform fly in such a space for a long period of time for the purposes of environmental observation and telecommunication relay. In this case, it is difficult to apply a means used for the above-described scientific balloons, but it is necessary to have a propulsion power to keep a position of the platform against the wind in the stratosphere, and at the same time, a means is necessary for ascent and descent of the vehicle which enables high speed shuttling between the stratosphere and the ground.

In such a high-altitude airship, the volumetric increase/decrease caused by the temperature fluctuations, such as the super-heat of the buoyant gas affected by the solar radiation at high altitudes, should be absorbed by air-filled ballonets (i.e., air chambers) allowing air flow from/to the outside atmosphere, which are usually positioned fore and aft of the airship hull, and thereby the trim function of the pitch attitude is provided. For example, if a temperature fluctuation band of the buoyant gas is 70° C., and the mean temperature of the atmospheric air is about −53° C. (220° K in absolute temperature), the ballonet volume of not less than 70/220 of the hull volume is necessary, and as a result, the buoyancy of the ballonet space is lost and a weight is added by ballonet fabric materials, and the gas bag skin of the ballonet forms a free surface of the fluid boundary, namely between ballonet filled air and the buoyant gas in an envelope (airship hull body), which causes problems that the ballonet skin is exposed to the sloshing of the gas, and material fatigue of the fabric is apt to be caused by this kinetic movement.

SUMMARY OF THE INVENTION

Accordingly, it is one of the objectives of the present invention to solve such problems as described above, and basically to present a high-altitude airship suitable for a large-scale LTA platform which flies in the stratosphere, which is mainly propelled by the power obtained through the photovoltaic conversion of the sunlight, and which is effective for environmental observation, telecommunication relay, etc.

Another objective of the present invention is to provide a super-pressured high-altitude airship in which the hull (a gas bag) of the high-altitude airship allows no in-flow or out-flow of gas from or to, respectively, the outside atmosphere in the stratosphere, is capable of enduring the temperature fluctuations of the buoyant gas at a high altitude, is pressure-resistant, is of super-pressured structure to keep a constant hull volume even if the buoyant gas pressure inside of the hull is fluctuated, is free from the above-described ballonet disadvantages which could possibly lead to structural destruction buoyancy loss which minimizes the area and weight of fabric materials needed, and which simplifies the hull configuration.

Yet another objective of the present invention is to provide a super-pressured high-altitude airship capable of avoiding, as much as possible, the temperature fluctuations of the buoyant gas in the envelope caused by super heat, etc. effected by the solar radiation, and the fluctuation in volume (pressure) of the buoyant gas caused by the temperature fluctuation.

In order to achieve the above-mentioned objectives, the super-pressured high-altitude airship of the present invention is characterized by the gas bag, which forms an envelope that allows no in-flow or out-flow of a gas from or to, respectively, the outside atmospheric air at the mission altitude, is pressure-resistant so as to suppress the rise in internal pressure, and has a super-pressure structure to maintain the rigidity necessary for the envelope by the differential pressure between the internal pressure and the outside atmospheric pressure, and characterized in that a solar cell is placed on the upper external surface of the envelope, and a heating reduction means is provided below the installation surface of the solar cell to block the in-coming heat from the solar cell to the buoyant gas filled in the envelope and to prevent the internal pressure rise.

The heat reduction means in the above-described super-pressured high-altitude airship is provided to prevent the expansion of the buoyant gas by the super-heat due to solar radiation and the excessive pressure rise caused thereby, and comprises a ventilation space between the installation surface of the solar cell and the gas bag, and a ventilating means to forcibly circulate the outside air in this ventilation space. This ventilating means makes use of the excessively generated power by the above-described solar cell with the intense sunlight during daytime.

Further, the above-described envelope can be provided with a pitch attitude control means to trim the static balance of the pitch attitude angle of the airship hill by shifting a loaded weight in the longitudinal direction as necessary.

Since the hull of the super-pressured high-altitude airship of such a configuration is of super-pressure structure, only a pressure-resistant gas bag capable of enduring the temperature fluctuations at a high altitude may be provided, as compared with a conventional airship in which ballonets are separately installed at positions fore and aft of the hull to absorb the volumetric increase/decrease of the gas due to the temperature fluctuations at a high altitude, and as for the airship of the present invention, since the mission altitude is high and the atmospheric pressure is as low as 40–50 hPa, the strength of the gas bag may be smaller than that of an airship flying at a lower altitude with high atmospheric pressure, and the gas bag design is very simple in structure and easily operated. When the static balance control of the airship hull pitch attitude angle is necessary in place of the ballonets, the static balance can be regulated by shifting the loaded weight in the longitudinal direction by the pitch attitude control means.

In this super-pressure structure, when the buoyant gas temperature in the envelope is fluctuated, the internal pressure is also fluctuated by the temperature change, but since the heat blocking means, including the ventilation space and the ventilation means or similar, in order to forcibly circulate the outside air therein, are installed on the underside of the solar cell, which remarkably generates the heat due to the absorption of the sunlight, the heat transfer to the buoyant gas in the envelope is suppressed to minimize the pressure change by the temperature fluctuation of the buoyant gas (attributable to the super heat, etc.).

DETAILED DESCRIPTION OF THE PREFERRED EMBODIMENTS

Figure 1:
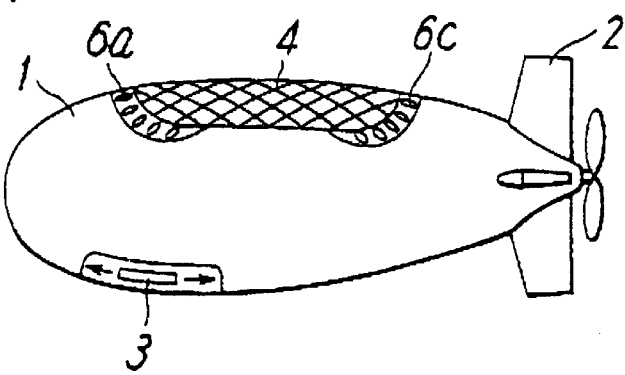
FIG. 1 is a side elevational view of an embodiment of a super-pressured high-altitude airship of the present invention.
Figure 2:
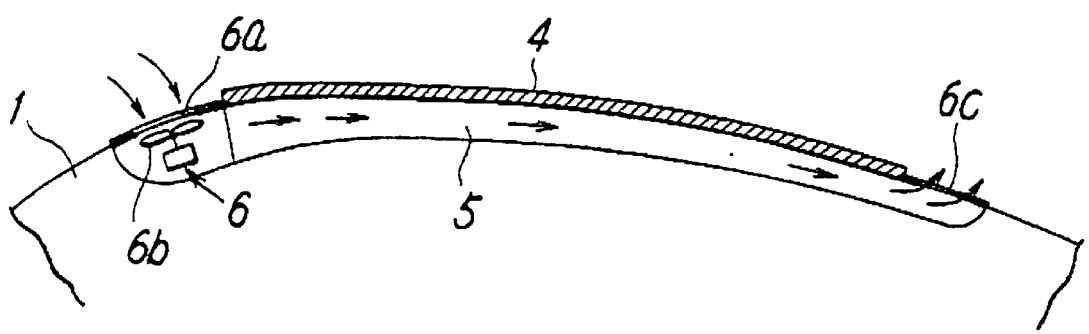
FIG. 2 is an enlarged, partial cross-sectional view of a major portion of the super-pressured high-altitude airship shown in FIG. 1.

FIG. 1 and FIG. 2 illustrate a super-pressured high-altitude airship of the present invention.

This high-altitude airship is provided with an envelope (airship hull body) 1 and a tail unit 2, which are formed of pressure membrane structures in which a buoyant gas, such as helium gas or similar, is filled inside, and the high altitude airship ascends with the usable buoyancy of the helium gas in a gas bag in an envelope 1, discharges a part of the buoyant gas equivalent to the usable buoyancy at the mission altitude and stays in the altitude of about from 20 to 22 Km above the ground, and descends under its own weight by further discharging a part of the helium gas. The descending speed is adjusted by a controlled quantity of the helium gas discharging. The airship attitude is controlled by the control surface, etc., and the high-altitude airship comes down on the sea surface, or on the ground, by controlling the speed so that the final descending speed is not too excessive and any risks, including collision with objects on the ground, can be avoided.

That means, this high-altitude airship, in general, does not ascend or descend by the powered propulsion, but carries out only the level flight at a high altitude by the powered propulsion, and can be referred to as a powered balloon.

The gas bag in the envelope 1 is the so-called super-pressure structure in which no gas is taken in from or discharged to the outside atmosphere at mission altitude of about from 20 to 22 km above the ground level, and the volume of the buoyant gas is fixed so that the weight of the atmosphere of the displaced volume of the airship at the specified altitude is balanced with the fully-equipped weight of the airship, and the necessary rigidity of the envelope is kept by the pressure difference between the internal pressure in the envelope 1 and the outside atmospheric pressure. Though the helium gas in the envelope 1 is expanded or contracted by the temperature difference of the outside atmosphere, or by the sunlight, etc., the expansion of the helium gas leads to an increase in the internal pressure since the envelope is closed, and thus, it is necessary to have the pressure resistance to confine the expandable part.

The envelope 1 having this super-pressure structure is not equipped with a ballonet (air chamber) to regulate the internal pressure in the envelope and trim (regulate) the static balance of the airship pitch attitude angle, but is equipped with a pitch attitude control means to trim the static balance of the airship pitch attitude angle by shifting a weight 3 such as a secondary battery aboard the airship in the longitudinal direction. The movement of the weight 3 in the longitudinal direction can be controlled by a driving means to obtain the traveling distance and the moving weight can provide a similar effect as the conventional trim effect of the ballonet.

In a conventional non-rigid airship, two ballonets are generally installed fore and aft of the envelope in a separated way, and the static balance of the airship pitch attitude angle is trimmed by eccentrically loading air in thefore or aft ballonet. The structure without any ballonet installed in the envelope 1 can minimize the area and the weight of a fabric material to be used, thus reducing the weight of the airship, and improving the function of the airship by omitting the ballonet space which should be filled with air, and can not contribute to the buoyancy. Since the air bag skin of the ballonet forms a free boundary surface of fluids, namely the boundary between air in the ballonet and helium gas in the envelope, the air bag is exposed to the sloshing of the gas, and a fatigue in the fabric material is caused by the kinetic load, but such a problem can be circumvented in the structure without ballonets.

In the super-pressure structure, the pressure fluctuation due to the temperature change of the helium in the envelope 1 is absorbed by the pressure resistance of the gas bag, and a high strength fabric becomes necessary for the fabric material to form the gas bag, time after time resulting in a large weight increase. But the case of excessive increase in weight of the fabric material can be prevented by installing a small ballonet close to the center of gravity of the airship hull.

Further, in the altitude of about from 20 to 22 km, the weather is fine throughout the year, and the sunshine can be constantly used as an energy source, and therefore, a solar cell 4 is arranged on the upper external surface of the envelope 1. Since this solar cell 4 is heated by the sunshine, helium filled in the envelope 1, as the buoyant gas, is then heated and its temperature rises. The heat is transmitted to the buoyant gas in the envelope 1 mainly through the surface of this solar cell 4, and in order to prevent the fluctuation in temperature of the buoyant gas caused by this heat, a ventilation space 5 is provided between the solar cell 4 and the gas bag below the installation surface of the solar cell 4, and a ventilating means 6 is provided to forcibly circulate a large volume of outside air in this ventilation space 5. As illustrated in the figure, this ventilating means 6 is suitable for the structure in which outside air, of sufficient quantity to dissipate the heat of the solar cell 4, is conveyed by a suction fan 6b through a large number of air inlets 6a provided in the envelope 1 front of the solar cell 4. Then, the outside air passes through the ventilation space 5 and is discharged outside through rear discharge holes 6c. However, other structures, for example, other blowing means is place of the suction fan 6b may also be employed.

By the above-describes solar cell 4 harvesting excessive power under the intense sunshine in the daytime, the suction fan 6b can be driven. The power harvested by the solar cell 4 can also be used to propel the airship against the wind. However, it goes without saying that other sources of power can also be used in unison.

Figure 3:
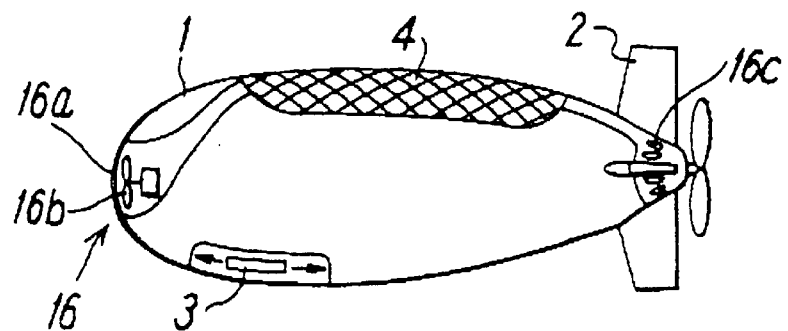
FIG. 3 is a side elevational view of another embodiment of the super-pressured high-altitude airship of the present invention.

Further, as the ventilating means 16 in the embodiment illustrated in FIG. 3, an air inlet 16a and a suction fan 16b can be provided at the for end of the airship hull which can also be used as a fan to draw the outside air when the airship descends, and in addition, the ventilation space provided between the gas bag and the installation surface of the solar cell 4 communicates with a discharge hole 16c provided at a position aft of the airship hull, and the air discharged therefrom can also be used for fluid control to reduce the airship hull drag. Since other constituent parts and the operation in this embodiment are the same as those in FIGS. 1 and 2, the description thereof is omitted by giving the same symbol to the same or equivalent structure.

Since the super-pressured high-altitude airship having the above-described configuration is provided only with a pressure-resistant gas bag at high altitude which is capable of enduring the temperature fluctuation, as compared with a system in which ballonets are installed at fore and aft positions of the airship hull in a separated manner to absorb the volumetric variation caused by the temperature fluctuation of the buoyant gas similar to a conventional airship, the configuration of the gas bag becomes very simple and is easily operated. Further, the strength of the gas bag can be minimized as compared with an airship flying at a low altitude. In place of the above-described ballonet, the static balance of the airship pitch attitude angle can be easily regulated by shifting the on-board weight 3 in the longitudinal direction by a pitch attitude control means. The heat transfer to the buoyant gas in the envelope 1 is blocked by the ventilation space 5 provided below the installation surface of the solar cell 4 and by the ventilation means 6 which forcibly circulates the outside air therein. Thus, the temperature fluctuation is minimized thereby, and the change in pressure of the buoyant gas can also be minimized.

At the altitude of 22 km above ground level, the atmospheric pressure is about 40 hPa (400 mmaq), and the maximum wind velocity is smaller than that at the altitude of 20 km above ground level (the atmospheric pressure is about 50 hPa=500 mmaq). Since the power of the airship required to resist the wind for horizontal flight is proportional to the third power of the wind velocity, the propulsion power system at the altitude of 22 km above ground level can be smaller. However, the density of the atmospheric air at the altitude of 22 km above ground level is 14/19 times that at the altitude of 20 km above ground level, and the buoyancy of the unit displaced volume is reduced by this quantity. However, in assuming that the mounted power system has 45% of the fully-equipped vehicle weight, and the wind velocity at the altitude of 22 km above ground level is 25% smaller than that at the altitude of 20 km above ground level, the mission altitude of 22 km is more advantageous since the weight of the power system is proportional to the density of the atmospheric air multiplied by the third power of the wind velocity. The rate of occurrence of high wind over 20 years in the past during the winter time in Kanto Plain Area in Japan shows that the wind velocity is 40 m/s and 35 m/s at the altitudes of 20 km and 22 km, respectively, above ground level. That is, the wind velocity at the altitude of 20 km is higher than that at the altitude of 22 km by 5 m/s, and the require power at the altitude of 22 km is far smaller.

On the other hand, assuming that the temperature fluctuation of helium as the buoyant gas is 70° C. both at the altitude of 20 km and 22 km above the ground level, and the mean temperature at the altitude of 20 km and 22 km above the ground level is about −53° C. (220 K. in absolute temperature), the pressure fluctuation is (70/220)×(absolute pressure in the envelope). Since the absolute pressure in the envelope is set to be higher than the outside atmospheric pressure by about 20 to 50 mmaq, the rise in pressure caused by the assumed temperature rise is 420 mmaq×(70/220)≈76 mmaq at the altitude of 22 km above the ground level, and the rise in pressure can be 80% of that at the altitude of 20 km above the ground level. Compared with one atm pressure on the ground level, the pressure becomes 10,000 mmaq× (70/220)≈3,200 mmaq, which means the fluctuation in pressure can be as small as 1/50.

What is claimed is:

1. A super-pressured high-altitude airship comprising:

a gas bag, which forms an envelope, allows no in-flow or out-flow of a gas from or to, respectively, an outside atmospheric air at a mission altitude, said gas bag being pressure-resistant so as to endure a rise in internal pressure, and said gas bag having a super-pressure structure to maintain a rigidity necessary for said envelope by a pressure difference between said internal pressure and the outside atmospheric pressure; and a solar cell arranged on an upper external surface of said envelope; and a heat blocking means, provided below an installation surface of said solar cell, configured to prevent heat from said solar cell from being transferred to said gas, which is buoyant and which is filled in said envelope, and also configured to prevent said rise in said internal pressure, wherein said heat blocking means includes a ventilation space, located between said gas bag and said installation surface of said solar cell, and a ventilating means configured to forcibly circulate the outside atmospheric air in said ventilation space, wherein said ventilating means includes a suction fan provided on an air inlet on said ventilation space, and wherein said suction fan is driven by an excessive power generated by said solar cell.

2. The super-pressured high-altitude airship according to claim 1, wherein the outside air is taken in from a large number of air inlets provided through said envelope at a position in front of said solar cell and discharged outside of said envelope from rear exhaust holes through said ventilation space.

3. The super-pressured high-altitude airship according to claim 2, wherein said air inlets and said suction fan of said ventilation space which form said heat blocking means are provided at a front of a hull of said airship, and said suction fan is also used to intake the outside atmospheric air when said airship descends.

4. The super-pressured high-altitude airship according to claim 3, wherein said ventilation space communicates with a discharge hole at a rear of said hull of said airship, and air discharged therefrom can also be used for fluid control to reduce drag of said hull of said airship.

5. The super-pressured high-altitude airship according to any one of claims 1–4, wherein said envelope is provided with a pitch attitude control means configured to trim a static balance of an airship pitch attitude angle by shifting an on-board weight in a longitudinal direction.

6. A super-pressured high-altitude airship comprising:

a gas bag forming an envelope for preventing in-flow or out-flow of a gas from or to, respectively, an outside atmospheric air at a mission altitude, said gas bag being pressure-resistant so as to endure a rise in internal pressure, and said gas bag having a super-pressure structure to maintain a rigidity necessary for said envelope by a pressure difference between said internal pressure and the outside atmospheric pressure; and a solar cell arranged on an upper external surface of said envelope; and a heat blocking means, provided below an installation surface of said solar cell, for preventing heat from said solar cell from being transferred to said gas, which is buoyant and which has filled in said envelope and for preventing said rise in said internal pressure, wherein said heat blocking means includes a ventilation space, located between said gas bag and said installation surface of said solar cell, and a ventilating means configured to forcibly circulate the outside atmospheric air in said ventilation space, wherein said ventilating means includes a suction fan provided on an air inlet on said ventilation space, and wherein said suction fan is driven by an excessive power generated by said solar cell.

7. The super-pressured high-altitude airship according to claim 6, wherein the outside atmospheric air is taken in from a large number of air inlets provided through said envelope at a position in front of said solar cell and discharged outside of said envelope from rear exhaust holes through said ventilation space.

8. The super-pressured high-altitude airship according to claim 7, wherein said air inlets and said suction fan of said ventilation space which form said heat blocking means are provided at a front of a hull of said airship, and said suction fan is also used to intake the outside atmospheric air when said airship descends.

9. The super-pressured high-altitude airship according to claim 8, wherein said ventilation space communicates with a discharge hole at a rear of said hull of said airship, and air discharged therefrom can also be used for fluid control to reduce drag of said hull of said airship.

10. The super-pressured high-altitude airship according to one of claims 6–9, wherein said envelope is provided with a pitch attitude control means for trimming a static balance of an airship pitch attitude angle by shifting an on-board weight in a longitudinal direction.

* * * * *